United States Patent
Vanderford et al.

(10) Patent No.: US 10,969,018 B2
(45) Date of Patent: Apr. 6, 2021

(54) BOOSTER ASSEMBLY FOR GATE VALVES

(71) Applicant: Cameron International Corporation, Houston, TX (US)

(72) Inventors: Delbert Edwin Vanderford, Cypress, TX (US); Stuart Robinson, Katy, TX (US); Joseph A Hedges, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 117 days.

(21) Appl. No.: 15/797,830

(22) Filed: Oct. 30, 2017

(65) Prior Publication Data

US 2019/0128427 A1 May 2, 2019

(51) Int. Cl.
| | |
|---|---|
| E21B 29/04 | (2006.01) |
| F16K 31/00 | (2006.01) |
| F16K 1/48 | (2006.01) |
| E21B 33/072 | (2006.01) |
| F16K 31/122 | (2006.01) |

(52) U.S. Cl.
CPC ............... *F16K 1/48* (2013.01); *E21B 29/04* (2013.01); *E21B 33/072* (2013.01); *F16K 31/002* (2013.01); *F16K 31/1221* (2013.01)

(58) Field of Classification Search
CPC . F16K 1/48; F16K 17/046; F16K 3/02; F16K 3/0254; F16K 31/124; F16K 31/1221; F16K 31/002; F16K 31/1225; F16K 17/383
USPC ..... 251/291, 326, 318, 11, 129.03; 403/351, 403/352
See application file for complete search history.

(56) References Cited

U.S. PATENT DOCUMENTS

| | | | | |
|---|---|---|---|---|
| 1,924,868 A | * | 8/1933 | Lovekin | F16K 17/383 137/68.12 |
| 4,635,670 A | * | 1/1987 | Kilmoyer | F16K 17/383 137/75 |
| 4,651,970 A | * | 3/1987 | Sadler | E21B 29/04 251/297 |
| 5,039,043 A | * | 8/1991 | Hodge | B01L 9/00 248/125.8 |
| 6,684,897 B2 | * | 2/2004 | Sundararajan | F16K 31/122 137/15.19 |
| 2005/0151107 A1 | * | 7/2005 | Shu | F16K 3/243 251/214 |
| 2009/0049671 A1 | * | 2/2009 | O'Hara | F16K 1/48 29/213.1 |
| 2011/0308619 A1 | * | 12/2011 | Martino | E21B 34/02 137/1 |
| 2014/0183385 A1 | * | 7/2014 | Adams | F15B 15/1438 251/128 |
| 2015/0076377 A1 | * | 3/2015 | Adams | E21B 33/063 251/62 |
| 2015/0144816 A1 | * | 5/2015 | Hoang | E21B 29/04 251/31 |

* cited by examiner

*Primary Examiner* — Kelsey E Cary
(74) *Attorney, Agent, or Firm* — Fletcher Yoder, P.C.

(57) ABSTRACT

A booster assembly includes a booster body configured to removably couple to an actuator body of an actuator of a gate valve, a booster stem configured to removably couple to an actuator stem of the actuator, and a booster biasing member configured to provide a supplemental force to supplement an actuating force applied by the actuator to drive a gate of the gate valve from an open position to a closed position.

20 Claims, 4 Drawing Sheets

BOOSTER ASSEMBLY FOR GATE VALVES

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below the surface of the earth, drilling and production systems are often employed to access and extract the resource. These systems may be located onshore or offshore depending on the location of a desired resource. Further, such systems generally include a wellhead mounted above a wellbore through which the resource is extracted. A Christmas tree mounted above the wellhead may include a wide variety of components, such as valves, spools, and fittings that facilitate extraction, injection, and other operations. During certain operations (e.g., wireline operations), wirelines or other structures may extend through a bore of the Christmas tree toward the wellbore. Thus, certain valves of the Christmas tree may need to sever the wirelines or other structures to move from an open position to a closed position to control or to block fluid flow across the valve.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure include a booster assembly for a gate valve. More specifically, the booster assembly is configured to provide a supplemental force to supplement an actuation force generated by an actuator (e.g., e.g., spring-biased actuator, electrical actuator, magnetic actuator, hydraulic actuator, pneumatic actuator, or any combination thereof) of the gate valve. For example, the booster assembly may include a biasing element (e.g., spring, pressurized gas, or the like) to create the supplemental force acting on the actuator. In this manner, the supplemental force may cooperate with the actuation force generated by the actuator to improve actuation of the gate valve and/or to enable the gate valve to cut a wireline or other structure extending through the gate valve. In certain embodiments, the booster assembly may be configured to be removably coupled to existing gate valves. For example, the booster assembly may be coupled to a gate valve during wireline operations, and then removed from the gate valve after completion of the wireline operations. Thus, while the booster assembly is not attached to the gate valve, the gate valve may have a compact configuration. Furthermore, the booster assembly may be used with multiple different valves associated with multiple different mineral extraction systems over time, thereby reducing overall equipment costs, for example. It should be appreciated that the booster assembly may be adapted for use with various other types of valves.

Figure 1:
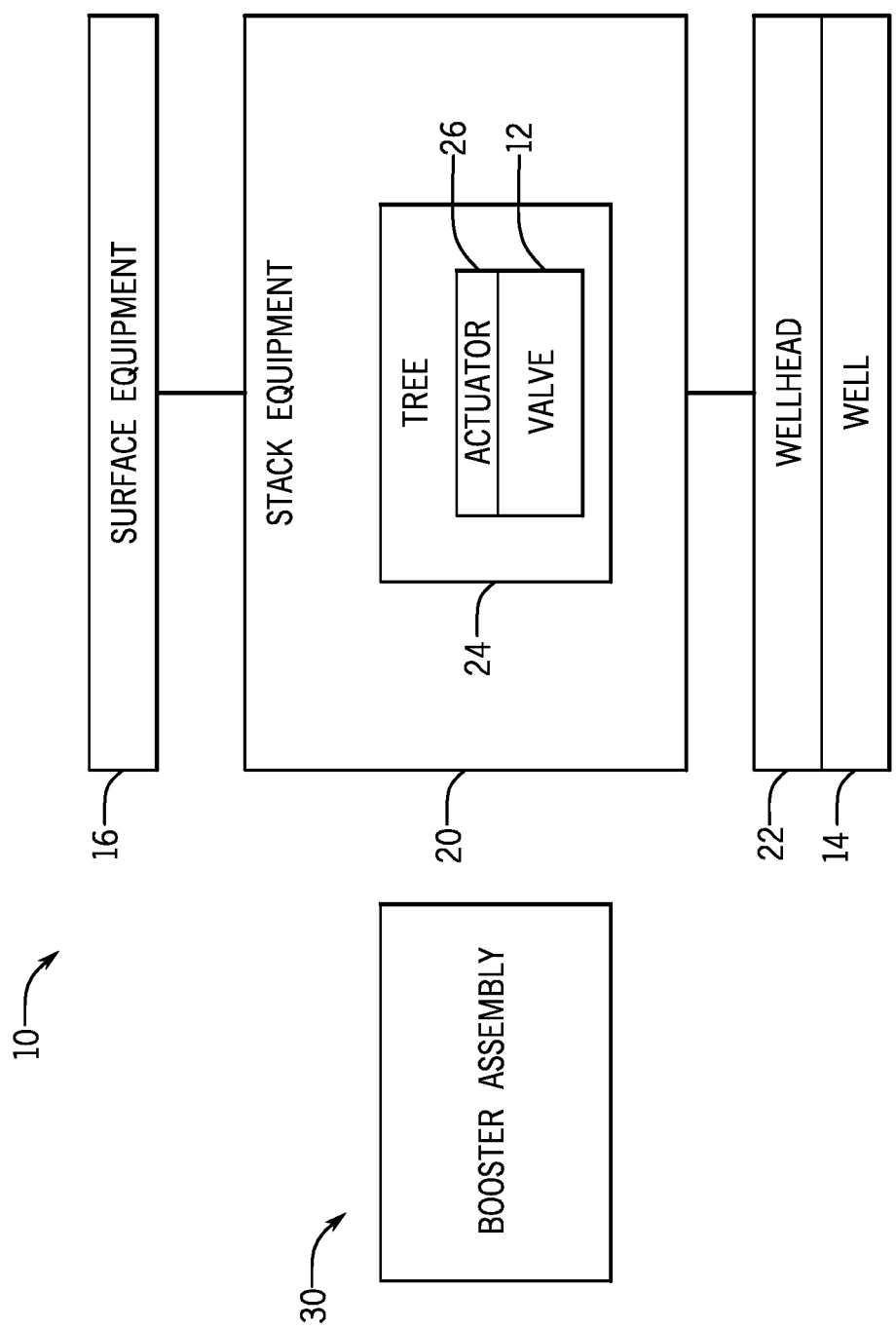
FIG. 1 is a block diagram of a mineral extraction system having a valve, in accordance with an embodiment of the present disclosure.

With the foregoing in mind, FIG. 1 illustrates an embodiment of a mineral extraction system 10 (e.g., hydrocarbon extraction system) having a valve 12 (e.g., gate valve). In the illustrated embodiment, the system 10 is configured to facilitate the extraction of a resource, such as oil or natural gas, from a well 14. As shown, the system 10 includes a variety of equipment, such as surface equipment 16 and stack equipment 20, configured to extract the resource from the well 14 via a wellhead 22. The surface equipment 16 may include a variety of devices and systems, such as manifolds, processing systems, treatment systems, pumps, conduits, valves, power supplies, cable and hose reels, control units, a diverter, a gimbal, a spider, and the like. As shown, the stack equipment 20 includes a production tree 24, also commonly referred to as a "Christmas tree." In the illustrated embodiment, the valve 12 is provided within the tree 24 to control the flow of an extracted resource out of the well 14 and upward toward the surface equipment 16 and/or to control the flow of injected fluids into the well 14. The valve 12 may be coupled to an actuator 26 (e.g., spring-biased actuator, electrical actuator, magnetic actuator, hydraulic actuator, pneumatic actuator, or any combination thereof) that is configured to drive the valve 12 between an open position to enable fluid flow across the valve 12 and a closed position to block fluid flow across the valve 12.

As shown, a booster assembly 30 may be provided to supplement the actuator 26. In some embodiments, the booster assembly 30 may be removably coupled to the actuator 26 prior to certain operations. For example and as discussed in more detail below, the booster assembly 30 may be removably coupled to the actuator 26 to enable the valve 12 to sever (e.g., cut) a wireline suspended through a bore of the tree 24.

While the valve 12 is discussed and illustrated as a gate valve to facilitate discussion, it should be understood that the valve 12 may any of a variety of valve types. Furthermore, the valve 12 may be located within any portion of the system 10, such as the surface equipment 16, other components of the stack equipment 20, and/or the wellhead 22. Thus, the booster assembly 30 may be coupled to any of a variety of valves 12 at any of a variety of locations about the system 10. While FIG. 1 illustrates a land-based system, it should be understood that the multiple valves 12 may be part of an offshore system, including part of subsea equipment (e.g., located below a sea surface and surrounded by sea water). For example, the valve 12 may be part of a subsea production tree, a subsea manifold, a subsea blowout preventer, or other structure located at a sea floor. In such cases, the booster assembly 30 may be positioned subsea to facilitate closing the valve 12. Furthermore, it should be understood that the valve 12 may be used to regulate any of a variety of fluids, such as any type of produced fluids, extracted fluids, supplied fluids, injected fluids, mud, water, steam, oil, gases, or the like, in any type of drilling and/or production system.

Figure 2:
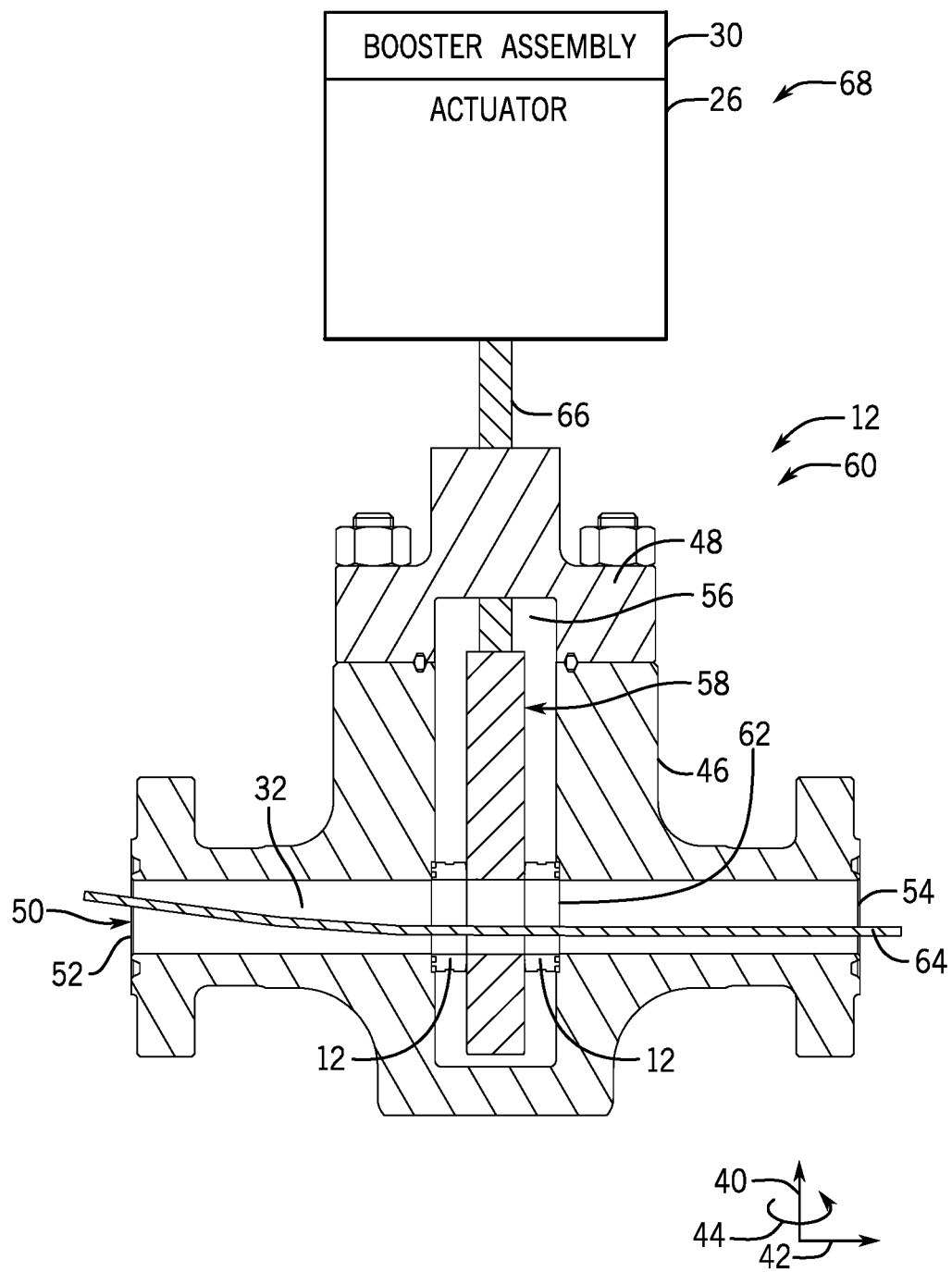
FIG. 2 is a schematic diagram of an embodiment of a booster assembly that may be coupled to an actuator to actuate the valve of FIG. 1.

FIG. 2 is a schematic diagram of the booster assembly 30 coupled to the actuator 26 of the valve 12. To facilitate discussion, the booster assembly 30 and other components disclosed herein may be described with reference to a longitudinal axis or direction 40, a lateral or radial axis or direction 42, and/or a circumferential axis or direction 44.

As shown, the valve 12 includes a body 46 (e.g., valve body), and the actuator 26 is coupled to a top portion of the body 46 via a bonnet 48; however, it should be appreciated that the actuator 26 may be coupled to a single or one-piece body of the valve 12. The body 46 and/or the bonnet 48 may be constructed of cast iron, ductile iron, cast carbon steel, gun metal, stainless steel, alloy steels, corrosion resistant alloys, and/or forged steels.

In the illustrated embodiment, the body 46 includes a bore 50 that extends laterally between an inlet 52 and an outlet 54, and a cavity 56 that extends longitudinally to receive a gate 58. In operation, the actuator 26 drives the gate 58 longitudinally through the cavity 56 to adjust the valve 12 between the illustrated open position 60 and a closed position. As shown, in the open position 60, an opening 62 of the gate 58 aligns with the bore 50 to enable fluid within the bore 50 to flow across the gate 58 and to enable placement of a wireline 64 or other structure through the bore 50. In the closed position, the opening 62 of the gate 58 does not align with the bore 50 and the gate 58 blocks fluid flow across the gate 58.

In certain embodiments, the booster assembly 30 may be coupled to the actuator 26 to form an actuation system 68 that provides sufficient force for the gate 58 to shear (e.g., cut) the wireline 64 or other structure within the bore 50, thereby enabling adjustment of the valve 12 from the open position 60 to the closed position while the wireline 64 or other structure extends through the bore 50. For example, the actuator 26 is configured to apply a force (e.g., a linear force) to an actuator stem 66 that couples the gate 58 to the actuator 26. When the booster assembly 30 is coupled to the actuator 26, the booster assembly 30 is configured to apply a supplemental force (e.g., supplemental linear force) to increase the overall force acting on the actuator stem 66 and the gate 58 to adjust the valve 12 from the open position 60 to the closed position while the wireline 64 or other structure extends through the bore 50.

Figure 3:
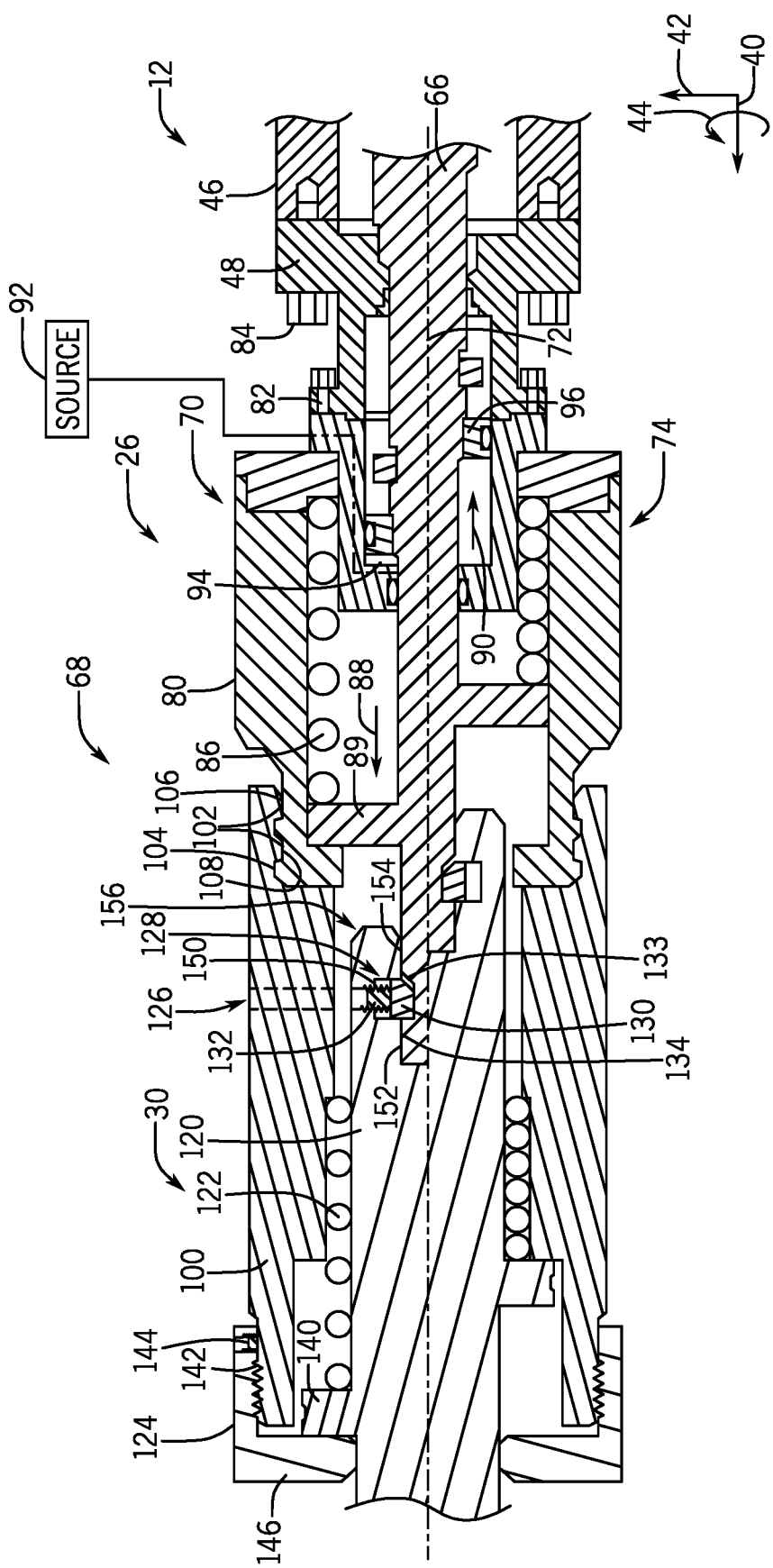
FIG. 3 is a cross-sectional side view of an embodiment of the booster assembly of FIG. 2.

FIG. 3 illustrates an embodiment of the booster assembly 30 coupled to the actuator 26 to form the actuation system 68. In FIG. 3, the booster assembly 30 and the actuator 26 are shown in a first position 70 (e.g., extended position) above a central axis 72, and the booster assembly 30 and the actuator 26 are shown in a second position 74 (e.g., compressed position) below the central axis 72. It should be understood that the gate 58 of the valve 12 is in the open position 60 while the booster assembly 30 and the actuator 26 are in the first position 70, and the gate 58 of the valve 12 is in the closed position while the booster assembly 30 and the actuator 26 are in the second position 74.

In the illustrated embodiment, the actuator 26 includes an actuator body 80 (e.g., annular body) that is coupled (e.g., via one or more fasteners, such as bolts 82) to the bonnet 48, which is in turn coupled (e.g., via one or more fasteners, such as bolts 84) to the body 46. As shown, the actuator 26 includes a biasing member 86 (e.g., spring or gas-filled chamber) that is positioned within the actuator body 80 and that is configured to bias the actuator stem 66 in the direction of arrow 88 toward the first position 70. For example, the biasing member 86 may contact and exert a force on a surface (e.g., longitudinally-facing annular surface) of a ring 89 (e.g., annular ring or flange) coupled to or integrally formed with the actuator stem 66, thereby driving the actuator stem 66 relative to the actuator body 80 in the direction of arrow 88. To drive the actuator stem 66 in the direction of arrow 90 toward the second position 72 to move the valve 12 into the open position 60, a fluid (e.g., liquid or gas) may be provided from a fluid source 92 to a chamber 94 (e.g., sealed annular chamber or space). For example, fluid within the chamber 94 may exert a force on a surface (e.g., longitudinally-facing annular surface) of a ring 96 (e.g., annular ring or flange) coupled to or integrally formed with the actuator stem 66, thereby driving the actuator stem 66 relative to the actuator body 80 in the direction of arrow 90. It should be appreciated that the actuator 26 may be additionally or alternatively be an electrical actuator or a magnetic actuator and/or include electrical or magnetic locks that are configured to drive and/or hold the valve 12 in the open position 60. In operation, when the fluid within the chamber 94 and/or the power to the locks is removed, the biasing member 86 may drive the actuator stem 66 in the direction of arrow 88 to adjust the valve 12 from the open position 60 to the closed position.

As shown, the booster assembly 30 includes a booster body 100 (e.g., annular body) that is coupled to the actuator body 80 of the actuator 26 via protrusions 102 (e.g., radially-inwardly extending protrusions) that engage corresponding grooves 104 of the actuator body 80. The protrusions 102 may extend partially about a circumference of the booster body 100 and the corresponding grooves 104 may extend partially about a circumference of the actuator body 80 (i.e., the protrusions 102 and the corresponding grooves 104 may be non-annular), such that the booster body 100 may be moved (e.g., slid) into position about the actuator body 80 and rotated (e.g., 45 degrees or 90 degrees) to engage the protrusions 102 with the corresponding grooves 104. Such a configuration may enable an operator to efficiently couple (and de-couple) the booster assembly to the actuator 26 at various times, such as prior to (and after) wireline operations.

As shown, the booster body 100 is positioned circumferentially about a portion of the actuator body 80, and the protrusions 102 are formed in a radially-inner surface 106 of the booster body 100, and the corresponding grooves 104 are formed in a radially-outer surface 108 of the actuator body 80. It should be appreciated that the booster body 100 may additionally or alternatively be coupled to the actuator body 80 at any suitable location and/or via various other types of couplings, such as fasteners (e.g., bolts), threads, clamp, bayonet mount, J-slot connector, key-slot interface, or the like.

In the illustrated embodiment, the booster assembly 30 includes a booster stem 120 positioned within the booster body 100, a booster biasing member 122 (e.g., spring or gas-filled chamber) positioned within the booster body 100, and a cap 124 coupled to the booster body 100. As shown, the booster stem 120 is coupled to the actuator stem 66 via a coupling assembly 128 that includes a split or snap ring 130 (e.g., c-shaped ring) and one or more energizing pins or screws 132, which may be pushed or rotated to drive the ring 130 radially-inwardly to engage a corresponding groove 133 formed in a radially-outer surface 134 of the actuator stem 66. In some embodiments, the one or more energizing pins or screws 132 may be circumferentially aligned with one or more openings 126 formed in the booster body 100 to provide access to the one or more energizing pins screws 132 to enable an operator to drive or rotate the one or more energizing pins or screws 132 to couple the booster stem 120 to the actuator stem 66.

In the illustrated embodiment, the biasing member 122 is positioned within the booster body 100 and is configured to bias the booster stem 100 (and the actuator stem 66 coupled thereto) in the direction of arrow 88 toward the first position 70. For example, the biasing member 122 may be supported by a seat 138 (e.g., annular seat or radially-inwardly extending surface) of the booster body 100, and the biasing member 122 may contact and exert a force on a surface (e.g., longitudinally-facing annular surface) of a ring 140 (e.g., annular ring or flange) coupled to or integrally formed with the booster stem 120, thereby driving the booster stem 120 relative to the booster body 100 in the direction of arrow 88. Thus, when the booster assembly 30 is coupled to the actuator 26, and the fluid is removed from the chamber 94, the biasing member 122 may provide a supplemental force to supplement the force provided by the biasing member 86 of the actuator 26 to drive the actuator stem 66 and the attached gate 58 from the open position 60 to the closed position.

As shown, the cap 124 is circumferentially surrounds a portion of the booster body 120 and is coupled to the booster body 120 via a threaded interface 142. The cap 124 may additionally or alternatively be coupled to the booster body 120 via one or more fasteners, such as bolts 144. The cap 124 may include a radially-inwardly extending portion 146 (e.g., annular portion) that is configured to limit or block movement of the booster stem 120 in the direction of arrow 88.

Various techniques and methods may be utilized to couple the booster assembly 30 to the actuator 26 and to operate the booster assembly 30. In some embodiments, the booster assembly 30 may be coupled to the actuator 26 while the actuator 26 is in the first position 70 and the valve 12 is the closed position. In some embodiments, the booster assembly 30 may be coupled to the actuator 26 while the actuator 26 is in the second position 74 and the valve 12 is the open position 60. In some such embodiments, the actuator 26 and the booster assembly 30 may be adapted to enable coupling of the booster stem 122 to the actuator stem 66 while the actuator 26 is in the second position 74 (e.g., the recess 133 of the actuator stem 66 may be located outside of the actuator body 80).

In some embodiments, the booster assembly 30 may be coupled to the actuator 26 by sliding the booster body 100 to circumferentially surround a portion of the actuator body 80, and then rotating the booster body 100 (e.g., 45 or 90 degrees) until the protrusions 102 engage the corresponding grooves 104. In some embodiments, the booster assembly 30 may additionally or alternatively be coupled to the actuator 26 via other types of couplings, as noted above. In some embodiments, the booster stem 120 is also coupled to the actuator stem 66. For example, the ring 130 may be in an expanded position within a recess 150 (e.g., annular recess) formed in a radially-inner wall 152 (e.g., annular wall) of a slot 154 formed at and open to one end 156 of the booster stem 120. The slot 154 may receive a portion (e.g., end portion) of the actuator stem 66, and the one or more energizing pins or screws 132 may be driven or rotated to drive the ring 130 radially-inwardly to engage the recess 133 formed in the radially-outer wall 134 of the actuator stem 66. In some embodiments, the one or more energizing pins or screws 132 may be circumferentially aligned with one or more openings 126 formed in the booster body 100 to provide access to the one or more energizing pins or screws 132 to enable an operator to drive or rotate the one or more energizing pins or screws 132 to couple the booster stem 120 to the actuator stem 66.

In some embodiments, after the booster body 100 is coupled to the actuator body 80, and after the booster stem 120 is coupled to the actuator stem 66, fluid may be provided to the chamber 94 to drive the actuator stem 66 and the booster stem 120 coupled thereto in the direction of arrow 90. As the fluid fills the chamber 94, the ring 89 contacts and compresses the biasing member 86, and the ring 140 contacts and compresses the biasing member 122, as the actuation system 68 moves from the first position 70 to the second position 74 to adjust the valve 12 from the closed position to the open position 60.

In some embodiments, the fluid within the chamber 94 may maintain or hold the actuation system 68 in the second position 74 and the valve 12 in the open position 60. It should be appreciated that the actuator 26 may be additionally or alternatively be an electrical actuator or a magnetic actuator and/or include electrical or magnetic locks that are configured to drive and/or hold the valve 12 in the open position 60. In operation, when the fluid within the chamber 94 and/or the power to the locks is removed, the biasing member 86 may drive the actuator stem 66 in the direction of arrow 88 and the biasing member 122 of the booster assembly 30 may provide a supplemental force that enables the gate 58 to cut the wireline 64 or other structure to adjust the valve 12 from the open position 60 to the closed position.

In some embodiments, the booster assembly 30 may be pre-assembled (e.g., the booster body 100, the booster stem 120, the coupling assembly 128, the biasing member 122, and the cap 124 may be coupled to one another) and then coupled as a unit to the actuator 26. Such a configuration may facilitate efficient coupling and de-coupling of the booster assembly 30. However, it should be appreciated that, in some embodiments, that various components of the booster assembly 30 may be coupled to the actuator 26 in sequence or in separate steps. For example, in some embodiments, the booster stem 120 may be coupled to the actuator stem 66 via the coupling assembly 128, then the booster body 120 may be coupled to the actuator body 80, then the biasing member 122 may be positioned within the booster body 120, and then the cap 124 may be coupled to the booster body 120 to complete the assembly.

The booster assembly 30 may advantageously be coupled to different actuators 26 of various valves 12 over time, thus reducing overall equipment costs and/or reducing size of the valves 12 during typical operations (e.g., non-wireline operations), for example. In some embodiments, the booster assembly 30 may be portable and may be transported from well to well to be coupled to the respective valve 12 during wireline operations or at any time the supplemental force on the actuator 26 is desired. For example, an operator may couple the booster assembly 30 to a first actuator 26 of a first valve 12, then de-couple the booster assembly 30 from the first valve 12, and then couple the booster assembly to a second actuator 26 of a second valve 12. Furthermore, the booster assembly 30 may enable multiple valves (e.g., some or all of the valves) on one Christmas tree to have the same or similar size (e.g., extend outwardly from the Christmas tree by the same or similar distance), which may reduce the footprint of the Christmas tree and/or facilitate the use of the same tools with each of the multiple valves.

Figure 4:
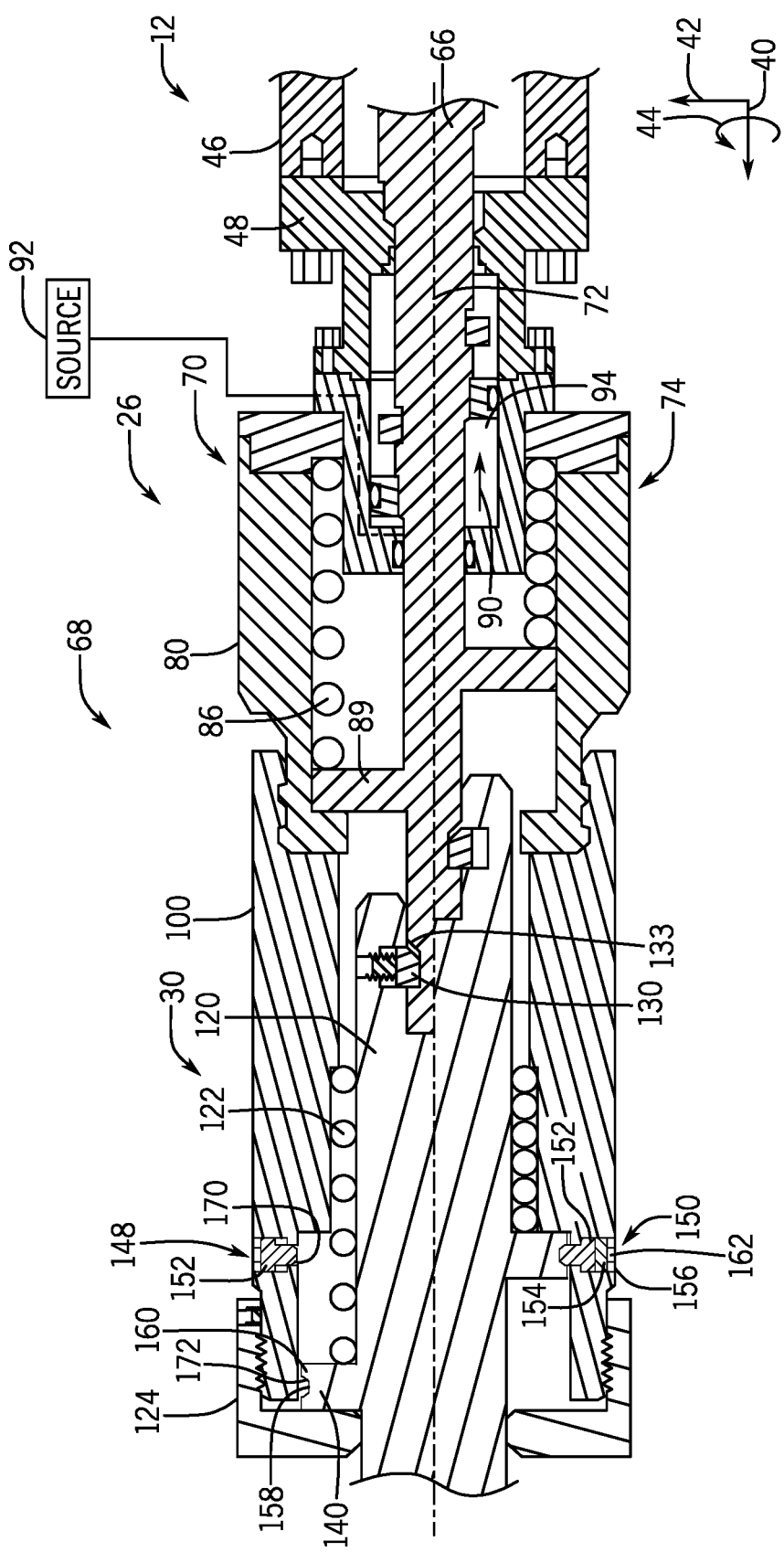
FIG. 4 is a cross-sectional side view of an embodiment of the booster assembly of FIG. 2, wherein the booster assembly includes a release system.

FIG. 4 is an embodiment of the booster assembly 30 coupled to the actuator 26 to form the actuation system 68. In FIG. 4, the booster assembly 30 and the actuator 26 are shown in the first position 70 above the central axis 72, and the booster assembly 30 and the actuator 26 are shown in the second position 74 below the central axis 72 to facilitate discussion. As shown, the booster assembly 30 includes a release system 148. The release system 148 may include one or more release devices 150 each having a plug 152, a meltable component 154, and a support structure 156. In particular, each release device 150 may include a respective plug 152 configured to contact and engage a corresponding recess 158 formed in a radially-outer surface 160 of the booster stem 120 (e.g., a radially-outer surface of the ring 140 of the booster stem 120). Each release device 150 may also include a respective meltable component 154 that contacts and is positioned radially-outwardly of the respective plug 152, and a respective support structure 156 that contacts and is positioned radially-outwardly of the meltable component 154. As shown, each release device 150 extends radially through a passageway 164 of the booster body 100. In the illustrated embodiment, the support structure 156 is an annular structure (e.g., a nut) that is threadably coupled to an inner surface of the passageway 164. However, it should be appreciated that the support structure 156 may have any form or may be omitted and/or that the booster body 100 may be modified to support the meltable component 154 within the passageway 164, for example.

In some embodiments, the meltable component 154 may be a eutectic material that includes two or more materials and that is configured to melt at a particular temperature (e.g., a threshold temperature or melting point), which may be a temperature lower than the respective melting point of each of the two or more materials and/or a temperature lower than the respective melting point of the other components of the booster assembly 30. In some embodiments, the meltable component 154 is a eutectic material that is formed from two or more metal alloys.

In operation, the one or more release devices 150 hold or maintain the actuation system 68 in the second position 74 to hold or maintain the valve 12 in the open position 60. However, upon an increase in temperature (e.g., over the threshold temperature), the meltable component 154 melts (e.g., transforms from a solid state into a liquid state) and passes through an opening 162 formed in the support structure 156. As the meltable component 154 melts and passes through the opening 162, the plug 152 moves radially-outwardly and disengages from the recess 158, and the biasing members 86, 122 drive the booster stem 120 and the actuator stem 66 to the first position 70 to adjust the valve 12 to the closed position. In some embodiments, a radially-inner end portion of each plug 152 includes a tapered surface 170 and the recess 158 of the ring 140 of the booster stem 120 includes a corresponding tapered surface 172. Such a configuration may enable the biasing member 86 to drive the plug 152 radially-outwardly as the meltable component 154 melts, thereby enabling the actuation system 68 to reach the first position 70.

In the illustrated embodiment, multiple release devices 150 are positioned at discrete locations about the circumference of the booster body 100. However, in some embodiments, the booster assembly 30 may include one release device 150 that includes a c-shaped ring plug 152 (e.g., split or snap ring) and the meltable component 154 and the support structure 156 may be annular or substantially annular.

The booster assembly 30 may generally be coupled to the actuator 26 in the manner disclosed above with respect to FIG. 3. In some embodiments, the booster assembly 30 may be coupled to the actuator 26 while the actuator 26 is in the first position 70 and the valve 12 is the closed position. In some such embodiments, after the booster body 100 is coupled to the actuator body 80, and after the booster stem 120 is coupled to the actuator stem 66, fluid may be provided to the chamber 94 to drive the actuator stem 66 and the booster stem 120 coupled thereto in the direction of arrow 90. As the fluid fills the chamber 94, the ring 89 contacts and compresses the biasing member 86, and the ring 140 contacts and compresses the biasing member 122, as the actuation system 68 moves from the first position 70 to the second position 74 to adjust the valve 12 from the closed position to the open position 60. In some embodiments, while the fluid in the chamber 94 holds the actuation system 68 in the second position 74, the release system 148 may be adjusted and/or installed on the booster assembly 30. For example, in some embodiments, an operator may adjust (e.g., rotate) the one or more support structures 156 to drive the one or more plugs 152 radially-inwardly to engage the one or more corresponding recesses 158. For example, in some embodiments, an operator may insert the one or more plugs 152 into respective passageways 164, position the one or more melting components 154 radially-outwardly of the one or more plugs 152, and then install the one or more support structures 156 (e.g., by coupling the one or more support structures 156 to the booster body 100). After the release system 148 is adjusted and/or installed such that the one or more plugs 152 engage the one or more corresponding recesses 158, the fluid may be removed from the chamber 94 (e.g., the chamber 94 may be vented), and the one or more plugs 152 may hold or maintain the actuation system 68 in the second position 74 and the valve 12 in the open position 60. Upon an increase in temperature above the threshold temperature of the one or more meltable components 154, the one or more meltable components 154 melt and pass through respective openings 162 of the one or more support structures 156, thereby enabling the one or more plugs 152 to move radially-outwardly and the biasing members 86, 122 to adjust the actuation system 68 from the second position 74 to the first position 70.

In some embodiments, the booster assembly 30 may be coupled to the actuator 26 while the actuator 26 is in the second position 74 and the valve 12 is the open position 60. In some such embodiments, the actuator 26 and the booster assembly 30 may be adapted to enable coupling of the booster stem 122 to actuator stem 66 while the actuator 26 is in the second position 74 (e.g., the recess 133 of the actuator stem 66 may be located outside of the actuator body 80). Once the booster assembly 30 is coupled to the actuator 26, the fluid may be removed from the chamber 94 (e.g., the chamber 94 may be vented), and the one or more plugs 152 may hold or maintain the actuation system 68 in the second position 74 and the valve 12 in the open position 60. Upon an increase in temperature above the threshold temperature, the one or more meltable components 154 melts and passes through respective openings 162 of the one or more support structures 156, thereby enabling the one or more plugs 152 to move radially-outwardly and the biasing members 86, 122 to adjust the actuation system 68 from the second position 74 to the first position 70.

As noted above, in some embodiments, the booster assembly 30 may be pre-assembled (e.g., the booster body 100, the booster stem 120, the coupling assembly 128, the biasing member 122, the cap 124, and the release system 148 may be coupled to one another) and then coupled as a unit to the actuator 26. Such a configuration may facilitate efficient coupling and de-coupling of the booster assembly 30. However, it should be appreciated that, in some embodiments, that various components of the booster assembly 30 may be coupled to the actuator 26 in sequence or in separate steps. For example, in some embodiments, the booster stem 120 may be coupled to the actuator stem 66 via the coupling assembly 128, then the booster body 120 may be coupled to the actuator body 80, then the biasing member 122 may be positioned within the booster body 120, then the cap 124 may be coupled to the booster body 120 to complete the assembly, and then the release system 148 may be installed within the one or passageways 164 of the booster body 100.

In addition to the advantages noted above with respect to the booster assembly 30 of FIG. 3, the release system 148 of FIG. 4 may enable the booster assembly 30 and the actuator 26 to automatically adjust the valve 12 from the open position 60 to the closed position in response to an increase in temperature (e.g., a temperature above the melting point of the one or more meltable components 154).

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A booster assembly, comprising:
 a booster body configured to removably couple to an actuator body of an actuator of a gate valve;
 a booster stem configured to removably couple to an actuator stem of the actuator;
 a booster biasing member configured to provide a supplemental force to supplement an actuating force applied by the actuator to drive a gate of the gate valve from an open position to a closed position; and
 a release system comprising one or more release devices supported by the booster body, wherein each of the one or more release devices comprises a plug, a meltable component, and a support structure, wherein the plug, the meltable component, and the support structure are supported within a passageway that extends radially through an annular wall of the booster body, and wherein the one or more release devices are configured to contact and engage a portion of the booster stem disposed within the booster body to hold the booster stem in a position against a bias of the booster biasing member while a temperature at the booster assembly is less than a threshold temperature and to disengage from the booster stem to enable the booster stem to move relative to the booster body via the bias in response to the temperature at the booster assembly exceeding the threshold temperature, thereby enabling the booster assembly to provide the supplemental force when the booster assembly is coupled to the actuator and when the temperature at the booster assembly exceeds the threshold temperature.

2. The booster assembly of claim 1, wherein the booster stem comprises a slot configured to receive the actuator stem.

3. The booster assembly of claim 2, comprising a coupling assembly configured to couple the booster stem to the actuator stem, wherein the coupling assembly comprises a c-shaped ring.

4. The booster assembly of claim 3, wherein the coupling assembly comprises one or more energizing screws extending radially through the booster stem, and wherein rotation of the one or more energizing screws is configured to drive the c-shaped ring radially-inwardly to engage an annular recess formed in a radially-outer wall of the actuator stem to couple the booster stem to the actuator stem.

5. The booster assembly of claim 1, wherein the booster body is configured to circumferentially surround a portion of the actuator body.

6. The booster assembly of claim 1, wherein a radially-inner wall of the booster body comprises one or more protrusions that are configured to engage one or more corresponding recesses of the actuator body to removably couple the booster body to the actuator body.

7. The booster assembly of claim 1, wherein the biasing member comprises a spring.

8. The booster assembly of claim 1, wherein the support structure comprises an annular structure that is configured to threadably couple to the passageway and comprises an opening to enable the meltable component to flow out of the passageway via the opening after the meltable component transitions from a solid state to a liquid state.

9. The booster assembly of claim 1, wherein the meltable component is physically separate from the plug and is positioned radially-outwardly of the plug, the meltable component is configured to transition from a solid state to a liquid state at the threshold temperature, the meltable component is configured to support the plug to enable the plug to engage the booster stem while the meltable component is in the solid state, and the plug is configured to disengage from the booster stem in response to the meltable component transitioning to the liquid state.

10. The booster assembly of claim 1, wherein the booster stem comprises a stem portion and a ring portion that extends radially-outwardly from the stem portion and that contacts the booster biasing member to compress the booster biasing member while the booster stem moves toward and is in the position against the bias of the booster biasing member, and wherein each of the one or more release devices engages the ring portion to hold the booster stem in the position against the bias of the booster biasing member while the temperature at the booster assembly is less than the threshold temperature.

11. The booster assembly of claim 10, wherein each of the one or more release devices engages a recess formed in a radially-outer surface of the ring portion to hold the booster stem in the position against the bias of the booster biasing member while the temperature at the booster assembly is less than the threshold temperature.

12. A system, comprising:
a first gate valve configured to move from an open position to a closed position;
a first actuator coupled to the first gate valve and configured to apply an actuating force in a first direction to drive the first gate valve from the open position to the closed position; and
a booster assembly configured to be removably coupled to the first actuator such that the first actuator is positioned between the booster assembly and the first gate valve along a longitudinal axis, such that a booster biasing member of the booster assembly biases an entirety of a booster stem of the booster assembly, an actuator stem of the first actuator, and a gate of the first gate valve in the first direction while the first gate valve is in the open position and such that the booster biasing member of the booster assembly provides a supplemental force in the first direction to supplement the actuating force to drive the first gate valve from the open position to the closed position.

13. The system of claim 12, wherein the booster assembly comprises a booster body configured to removably couple to an actuator body of the first actuator, the booster stem is configured to removably couple to the actuator stem of the first actuator, the actuator stem is coupled to the gate of the first gate valve, and the gate is configured to move within a bore of the first gate valve between a first gate position in which the gate enables a flow of fluid through the bore of the first gate valve such that the first gate valve is in the open position and a second gate position in which the gate blocks the flow of fluid through the bore of the first gate valve such that the first gate valve is in the closed position.

14. The system of claim 12, comprising a second gate valve and a second actuator, wherein the booster assembly is configured to be removably coupled to the second actuator.

15. The system of claim 12, wherein the booster assembly comprises a booster body, the booster stem, the booster biasing member, and a release device configured to contact and engage a portion of the booster stem disposed within the booster body to hold the booster stem in a position against the bias of the booster biasing member while a temperature at the booster assembly is less than a threshold temperature and to disengage from the booster stem to enable the entirety of the booster stem to move relative to the booster body via the bias in response to the temperature at the booster assembly exceeding the threshold temperature, thereby enabling the first actuator to apply the actuating force and the booster assembly to provide the supplemental force when the booster assembly is coupled to the first actuator and when the temperature at the booster assembly exceeds the threshold temperature.

16. The system of claim 12, wherein the booster stem comprises:
a stem portion that is removably coupled to and coaxial with the actuator stem of the first actuator; and
a ring portion that extends radially-outwardly from the stem portion;
wherein the booster biasing member contacts the ring portion to bias both the stem portion and the ring portion in the first direction while the first gate valve is in the open position.

17. The system of claim 12, wherein the entirety of the booster stem, the actuator stem of the first actuator, and the gate of the first gate valve are configured to move together as the first gate valve moves through a stroke from the open position to the closed position.

18. A method of operating a booster assembly, comprising:
coupling a booster body of the booster assembly to a first actuator body of a first actuator of a first gate valve such that the first actuator body is positioned between the booster body and the first gate valve along a longitudinal axis;
coupling a booster stem of the booster assembly to an actuator stem of the first actuator, wherein the actuator stem is coupled to a gate of the first gate valve while the first gate valve is in an open position;
biasing an entirety of the booster stem, the actuator stem, and the gate of the first gate valve toward a closed position using a booster biasing member of the booster assembly while the first gate valve is in the open position; and
driving the entirety of the booster stem, the actuator stem, and the gate to adjust the first gate valve from the open position to the closed position via a supplemental force provided by the booster biasing member and an actuating force provided by the first actuator.

19. The method of claim 18, comprising:
decoupling the booster body from the first actuator body of the first actuator of the first gate valve;
decoupling the booster stem from the actuator stem of the first actuator; and
subsequently coupling the booster body to a second actuator body of a second actuator of a second gate valve.

20. The method of claim 18, comprising:
engaging a portion of the booster stem disposed within the booster body with a release device to hold the first gate valve in the open position; and
automatically disengaging the booster stem from the release device to enable the first actuator and the booster biasing member to drive the first gate valve from the open position to the closed position in response to a temperature exceeding a threshold temperature.

* * * * *